SYSTEM FOR TRANSMISSION OF BINARY INFORMATION AT TWICE THE NORMAL RATE

Filed July 3, 1961

INVENTOR.
OTMAR E. RINGELHAAN
BY Jack H. Linscott
ATTORNEY.

3,162,724

SYSTEM FOR TRANSMISSION OF BINARY INFORMATION AT TWICE THE NORMAL RATE

Otmar E. Ringelhaan, Oceanport, N.J., assignor to the United States of America as represented by the Secretary of the Army Filed July 3, 1961, Ser. No. 121,792
17 Claims. (Cl. 178—68)
(Granted under Title 35, U.S. Code (1952), sec. 266)

Figure 1:
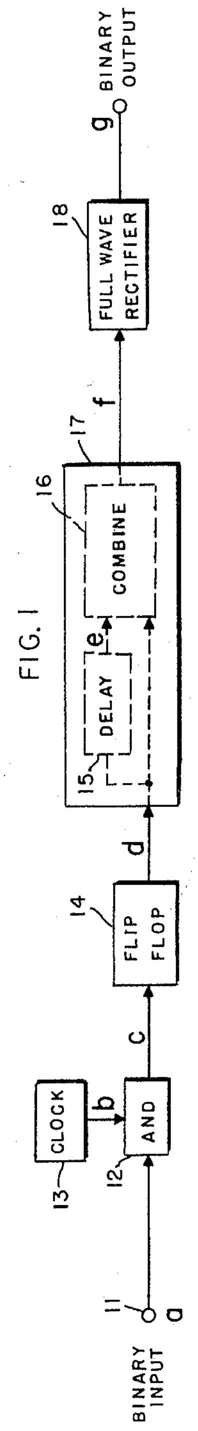

The invention described herein may be manufactured and used by or for the Government for govermental purposes, without the payment of any royalty thereon.

This invention relates to an electrical signal communication system using the techniques of biternary transmission for transmitting binary information in less bandwidth than normally required, and more particularly to an improved circuit for forming and decoding the biternary signal used.

Prior to the development of biternary techniques, the use of quaternary transmission appeared to be the ideal solution for doubling the capacity of communication systems without increasing the bandwidth. The pulses in quaternary transmission are transmitted at the same rate used for normal binary transmission, but they possess twice the information per pulse since each pulse has four possible amplitudes.

However, this gain in the information rate of a system using quaternary signals is exchanged for a considerable reduction in the tolerance of the system to all types of interference. In order to prevent exceeding a specified error rate, the total allowable interference, including noise, must be kept to about one-third of the level permissible with binary transmission. The absolute magnitude of the uncertainties that can be allowed with quaternary transmission therefore becomes quite small and, for some applications, leads to the necessity of taking elaborate and expensive precautions to assure acceptable performance. The sensitivity of quaternary systems to certain types of distortion, such as low-frequency cut-off effects which exist because of the presence of low-frequency order wire facilities or in wire transmission systems because of the transformers employed for increased efficiency and other reasons, is so high under other applications that adequate performance cannot be obtained. For these reasons quaternary transmission failed to meet present communication demands.

As discussed in detail in copending continuation-in-part application of Albert P. Brogle, Serial No. 236,461, filed on November 8, 1962, and its parent application, Serial Number 12,481, filed on March 2, 1960, and assigned to the same assignee as the present invention, also in his article "A New Transmission Method for Pulse Code Modulation Communication Systems, in I.R.E. Transactions-Communications Systems, vol. CS–8 #3, September 1960 pp. 155–160, and USASRDL internal Report Nr. 1954 of October 1958 cited therein, biternary transmission techniques permit the effective binary information rate to be doubled or, using the same information rate, permit the bandwidth required to be reduced by one-half relative to conventional systems used to transmit binary information. This technique, therefore, doubles the information rate capability of communications systems over that previously obtained by use of conventional prior art binary techniques; and this is accomplished with greater tolerance to interference than in quaternary transmission systems.

Biternary signals can be formed from a binary wave by using appropriate logic circuits or by transmitting the binary signal through a transmission channel having a Gaussian frequency response. In the former case, the binary wave is sent through two parallel paths to a combining circuit. One of these paths delays the signals passing therethrough one baud or one pulse interval. This delayed signal is added in like polarity to the undelayed signal from the other path in the combining circuit to form a three-level signal which may be transmitted through half the bandwith required to transmit the original binary signal. The signal thus transmitted is called a biternary signal and the original binary wave may be reproduced from this signal at the receiver. For purpose of comparison it should be noted that if the same delayed and undelayed signals are added in reverse polarity, otherwise considered as subtratced, the resulting three level signal (called "Dicode" or "Bipolar") requires the same bandwidth as the original; however, in the case of a wire line the objectionable very low frequency is reduced instead of the bandwidth as in biternary, since both cannot be reduced, at least by presently known techniques. In the latter case the binary wave is transmitted through a transmission channel having a Gaussian frequency response at double the bit rate for the same bandwidth normally used or, using the same bit rate, through half the normal bandwidth. The Gaussian frequency response of the channel is such that the rise time for the original binary pulses is equal to a pulse interval. When such pulse intervals are reduced by one-half by doubling the transmission rate, this rise time remains the same since nothing else has been changed. Thus it now takes two consecutive pulses of the same type, i.e. two "marks" or two "spaces," to allow the signal to attain the same levels previously attained by each pulse. When an alternating sequence of "marks" and "spaces" occurs, the signal level is halfway between these other two levels. A biternary signal formed in this manner has the same characteristics as if it had been formed by the logic circuits previously described and the same equipment may be used in the receiver to reproduce the binary wave regardless of which of the two methods is used to form the biternary signal. The situation may be analyzed in the same manner as in case of wide band filters and delay lines. Within the pass-band the phase-frequency characteristic is linear and attenuation moderate. However, at the top of the pass-band the higher frequency components are in effect delayed, attenuated, or degraded into the pass-band.

Previous attempts to simplify the system of application 12,481 for biternary signals formed from a single binary train have resulted in a somewhat less complex decoder from that of the application; but two decision circuits, a gate circuit, and a flip-flop were still necessary. In addition, this new decoder contained a phase-ambiguity whenever a sequence of alternating binary "ones" and "zeros" occurred. If an error was introduced anywhere in such a sequence, the remainder of the sequence was a succession of errors.

In accordance with this invention a new, simplified system for forming and decoding biternary signals form a binary train has been developed. The original binary signal is sampled at the bit rate providing a trigger pulse each time a "mark" or "one" occurs and no trigger pulse when "space" or "zero" occurs. These trigger pulses drive a complementary flip-flop producing a new binary signal which is then converted to a binary signal. At the receiver, the biternary signal is rectified in a full-wave rectifier, the output of which is the original binary signal. The conversion of the original binary signal represents the familiar binary integration, in which the integration constant permits two different outputs. The conversion to biternary and decoding by full-wave rectification together represents the familiar binary differentiation which also eliminates any effect of the integration constant. Conversion to dicode and similar decoding also represents such differentiation. The important point is that transmission of the biternary and dicode intermediate waves involves very different advantages; the first bandwidth, for wire or carrier systems, the second very low frequency suppression, only for wire systems and usually of lesser significance. While the integration could occur at the receiver, it would be then necessary to make allowance for the two possible outputs due to the integration constant.

It is an object of this invention to provide a biternary transmission system in which an error in any pulse will not affect the accuracy of the following train of pulses.

Another object of this invention is to provide a biternary system having a simple circuit configuration.

Figure 2:
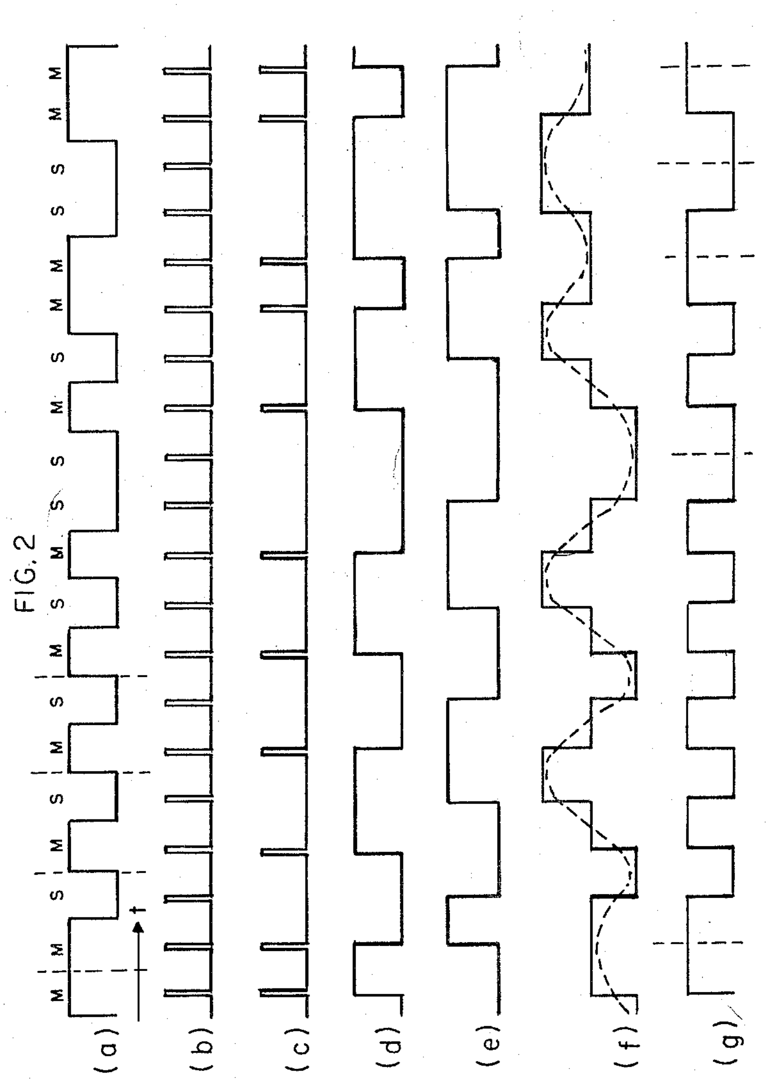

Other objects and features of the invention will become apparent to those skilled in the art upon consideration of the following detailed description taken in conjunction with the drawing in which:

FIG. 1 is a partial block diagram of a preferred embodiment of the invention; and FIG. 2 is a graphical illustration of waveforms useful in describing the operation of the circuit shown in FIG. 1.

Referring now to FIG. 1, a signal in the form of a conventional binary pulse train is supplied to a sampling gate 12 through an input terminal 11 from a suitable source (not shown). This binary pulse train may comprise a sequence of coded pulse groups in which, for the purposes of this illustration, a "mark" or "one" is represented by a positive or "on" pulse and a "space" or "zero" is represented by the absence of a pulse or an "off" pulse. The binary train is sampled at the bit rate in gate 12 by the application of sampling pulses to gate 12 from clock 13 which may be of any suitable type. The output of gate 12 is a sequence of discrete trigger pulses, each of which represents a "mark" in the original binary pulse train. There will be no trigger pulse during "space" intervals due to the action of AND gate 12.

The trigger pulses from gate 12 are applied symmetrically to a conventional complementary bi-stable flip-flop 14 to cause flip-flop 14 to change from one stable state to the other each time a trigger pulse is applied. The output from flip-flop 14 is in the form of a new binary signal having the same bit rate as the input signal. This new binary signal is then converted to a biternary signal in transmission channel 17. Transmission channel 17 may have the necessary Gaussian response to cause conversion alone or it may contain logic circuitry producing an equivalent result comprising a pair of parallel paths as shown by the dotted lines, one of which paths delays the input signal one pulse or baud by means of a delay line 15. The other path furnishes the undelayed new binary signal to a combining circuit 16 where it is added to the delayed signal to form the three-level biternary signal.

This biternary signal is then supplied to a full-wave rectifier 18. The output of rectifier 18 is a reproduction of the original binary signal which was supplied to input terminal 11.

The operation of the circuit of FIG. 1 will now be described in conjunction with FIG. 2 which shows the waveforms at various points in the circuit for a given input signal. Assume that the input binary signal applied to input terminal 11 is that shown in FIG. 2(*a*) with "marks" being represented by positive pulses and "spaces" being represented by the absence of any pulse. This binary signal is sampled at gate 12 once during the middle of each bit or pulse interval by timing pulses from clock 13 as shown in FIG. 2(*b*). Whenever one of these timing pulses concurs with a "mark" in the binary train of FIG. 2(*a*), gate 12 is enabled and a trigger pulse is passed to flip-flop 14. FIG. 2(*c*) shows the sequence of trigger pulses which occur for the binary signal train of FIG. 2(*a*). It will be noted that a trigger pulse occurs only during the time intervals occupied by a "mark" in the input binary train. Each time one of these trigger pulses is applied to flip-flop 14 the flip-flop changes state. This results in an output signal from flip-flop 14 as shown in FIG. 2(*d*). Comparison of the waveforms of FIG. 2(*a*) and FIG. 2(*d*) shows that the flip-flop changes state every time a "mark" occurs in the input binary train of FIG. 2(*a*). The output signal of flip-flop 14 is converted to a biternary signal in channel 17. This conversion is equivalent to delaying the signal for a period of one bit or pulse interval and adding it to the undelayed signal. The delayed signal is shown in FIG. 2(*e*). The undelayed signal of FIG. 2(*d*) is added to the delayed signal of FIG. 2(*e*) to give a three-level biternary output as shown by the waveform of FIG. 2(*f*). This biternary signal is then rectified by a full-wave rectifier 18 in the receiver to reconstruct the original binary signal train as shown in FIG. 2(*g*). Of course suitable wave shaping circuits may be used to give the desired waveform to this reconstructed signal.

If the flip-flop were initially in the opposite condition waves (*d*), (*e*) and (*f*) would be inverted (sometimes explained as a change of the binary integration constant). However, rectifier 18 will give the same result in either case (the same binary differentiation corresponding to two binary integrations).

The original binary train used in the illustration has been represented as a full-bauded train. However, if the input binary train is not a full-bauded train, gate 12 and clock 13 may be eliminated and the binary train itself may be used to trigger flip-flop 14. If desired, "space" or "zero" in the original binary train could be represented by a pulse and "mark" or "one" by the absence of a pulse without altering the operation of the invention.

The invention also may be extended to higher order codes which may be obtained by further reducing the bandwidth of the transmission path. In such cases an appropriate number of samplers and flip-flops in the transmitter and full-wave rectifiers in the receiver must be connected in series. For example, where the bandwidth of the transmission path is such that the Gaussian frequency response causes the two-level input signals to change to a five-level signal in a manner equivalent to delaying the input signal one pulse interval, two pulse intervals, and three pulse intervals and adding each of these delayed signals to the original, three successive sampler and flip-flop circuits must be connected in series at the transmitter, and two full-wave rectifiers must be connected in series at the receiver. The operation of each individual sampler, flip-flop, and rectifier is the same as described in conjunction with like elements in FIG. 1, and the output of the second rectifier will be a reproduction of the binary wave applied to the input of the first sampler.

In actual practice various means for transmitting and receiving the biternary signals can be employed. However, for the sake of clarity such transmitters and receivers have not been shown in the drawing since their details do not form any part of the invention. In carrier applications the elementary waveform above often becomes a symmetrical pair of envelopes, crossing at the symmetry line if the signal phase reverses relative to the carrier. Crossed square envelopes would form a superficially uniform envelope, but the actual effect on various circuits usually requires analysis as separate envelopes. Although use of carriers complicates analysis it does not change the overall significance of bandwidth in neutral or polar, audible carrier, ordinary keyed CW, suppressed carrier or SSB, FSK or FM, or other forms of telegraph and similar signals.

The specific embodiment of the invention shown in the drawing is merely illustrative of the principles of the invention, and various changes and modifications may be made without departing from the spirit and scope of the invention as set forth in the appended claims.

What is claimed is:

1. In a pulse communication system comprising a transmitter, channel, and receiver, the method of converting a first train of message information into a second train of information to be sampled, combining said second train undelayed and delayed by the interval between samples both in like polarity, each sample occupying a single time interval of a quantized level corresponding to one of only three values, having a probability of 50% at a median value and 25% at each of a first extreme or the other extreme, preventing samples of opposite extreme value separated only by samples of median value unless of odd number and samples of like extreme value separated only by samples of median value unless of even number, such train being identified as biternary, said channel having an operating bandwidth of only half the bandwidth which would be required for a binary train of samples of the same information content, and at said receiver station sampling said biternary three level train of pulses and reconverting into message information.

2. The method of claim 1 wherein said second train corresponds to the binary integral of said first train, whereby said reconversion into message information is substantially simplified.

3. A pulse communication system comprising:

a transmitter terminal for signals in one binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said, transmitter terminal and channel including means substantially to delay said signal one interval and to combine said delayed signal with said signal undelayed, both in like polarity, thus forming a three-level signal of biternary form for transmittal over said channel, said receiver terminal including full-wave rectifier means to convert the two extreme levels of said three level signal to one, and the median level to the other, level of a second binary form, the binary derivative of said one binary form, and a binary integrator at the transmitter terminal, whereby an input binary signal at the transmitter terminal is reproduced in identical form at the receiver terminal over a channel of only half the bandwidth required for binary transmission, and with only trivial conversion circuits.

4. A pulse communication system comprising:

a transmitter terminal for signals in one binary form clocked at regular intervals, a channel having an operating bandwith substantially only half that which would be required for transmitting information in said binary form, and a receiver terminal including means for sampling at said intervals and reconverting the output of said channel into information corresponding to said binary form, said transmitter terminal and channel including means substantially to delay said signal one interval and to combine said delayed signal with said signal undelayed, both in like polarity, thus forming a three-level signal of biternary form for transmittal over said channel, said receiver terminal including full-wave rectifier means to convert the two extreme levels of said three-level signal to one, and the median level to the other, level of a second binary form, the binary derivative of said one binary form, and a binary integrator at one terminal, whereby an input binary signal at the transmitter terminal is reproduced in corresponding form at the receiver terminal over a channel of only half the bandwidth required for binary transmission, and with only trivial conversion circuits.

5. A pulse communication system comprising:

a transmitter terminal for signals in one binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal and channel including means substantially to delay said signal one interval and to combine said delayed signal with said signal undelayed, both in like polarity, thus forming a three-level signal of biternary form for transmittal over said channel, said receiver terminal including full wave rectifier means to convert the two extreme levels of said three level signal to one, and the median level to the other, level of a second binary form, the binary derivative of said one binary form, whereby an input binary signal at the transmitter terminal is reproduced in corresponding form at the receiver terminal over a channel of only half the bandwidth required for binary transmission, and with only trivial conversion circuits.

6. A pulse communication system comprising:

a transmitter terminal for signals in one binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal and channel including means substantially to delay said signal one interval and to combine said delayed signal with said signal undelayed, both in like polarity, thus forming a three-level signal of biternary form for transmittal over said channel, whereby an input binary signal at the transmitter terminal is reproduced in corresponding form at the receiver terminal over a channel of only half the bandwidth required for binary transmission.

7. A pulse communication system comprising:

a transmitter terminal for signals in one binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal including means substantially to delay said signal one interval and to combine said delayed signal with said signal undelayed, both in like polarity, thus forming a three-level signal of biternary form for transmittal over said channel, said receiver terminal including full wave rectifier means to convert the two extreme levels of said three level signals to one, and the median level to the other, level of a second binary form, the binary derivative of said one binary form, and a binary integrator at the transmitter terminal, whereby an input binary signal at the transmitter terminal is reproduced in identical form at the receiver terminal over a channel of only half the bandwidth required for binary transmission, and with only trivial conversion circuits.

8. A pulse communication system comprising:
a transmitter terminal for signals in one binary form clocked at regular intervals,
a channel having an operating bandwidth substantially only half that which would be required for transmitting information in said binary form,
and a receiver terminal including means for sampling at said intervals and reconverting the output of said channel into information corresponding to said binary form,
said transmitter terminal including means substantially to delay said signal one interval and to combine said delayed signal with said signal undelayed,
both in like polarity, thus forming a three-level signal of biternary form for transmittal over said channel,
whereby an input binary signal at the transmitter terminal is reproduced in corresponding form at the receiver terminal over a channel of only half the bandwidth required for binary transmission.

9. A pulse communication system comprising:
a transmitter terminal for signals in one binary form clocked at regular intervals,
a channel having an operating bandwidth substantially only half that which would be required for transmitting information in said binary form,
and a receiver terminal including means for sampling at said intervals and reconverting the output of said channel into information corresponding to said binary form,
the transmission characteristics of said half bandwidth channel comprising means substantially to delay said signal one interval and to combine said delayed signal with said signal undelayed, both in like polarity, thus forming a three-level signal of biternary form for transmittal over said channel, said receiver terminal including full wave rectifier means to convert the two extreme levels of said three level signal to one, and the median level to the other, level of a second binary form, the binary derivative of said one binary form,
and a binary integrator at the transmitter terminal,
whereby an input binary signal at the transmitter terminal is reproduced in identical form at the receiver terminal over a channel of only half the bandwidth required for binary transmission, and with only trivial conversion circuits.

10. A pulse communication system comprising:
a transmitter terminal for signals in one binary form clocked at regular intervals,
a channel having an operating bandwith substantially only half that which would be required for transmitting information in said binary form,
and a receiver terminal including means for sampling at said intervals and reconverting the output of said channel into information corresponding to said binary form,
the transmission characteristics of said half bandwidth channel comprising means substantially to delay said signal one interval, and to combine said delayed signal with said signal undelayed, both in like polarity, thus forming a three-level signal of biternary form for transmittal over said channel,
whereby an input binary signal at the transmitter terminal is reproduced in corresponding form at the receiver terminal over a channel of only half the bandwidth required for binary transmission.

11. A pulse communication system comprising:
a transmitter terminal for signals in one binary form clocked at regular intervals,
a channel having an operating bandwith substantially only half that which would be required for transmitting information in said binary form,
and a receiver terminal including means for sampling at said intervals and reconverting the output of said channel into information corresponding to said binary form,
said transmitter terminal and channel including means for transmitting said binary signals over said half bandwidth channel by converting to biternary three-level form signals substantially the algebraic sum of said signal undelayed and delayed by one interval both in like polarity, said receiver terminal including full wave rectifier means to convert the two extreme levels of said three level signal to one, and the median level to the other, level of a second binary form, the binary derivative of said one binary form,
and a binary integrator at the transmitter terminal,
whereby an input binary signal at the transmitter terminal is reproduced in identical form at the receiver terminal over a channel of only half the bandwidth required for binary transmission, and with only trivial conversion circuits.

12. A pulse communication system comprising:
a transmitter signal for signals in one binary form clocked at regular intervals,
a channel having an operating bandwidth substantially only half that which would be required for transmitting information in said binary form,
and a receiver terminal including means for sampling at said intervals and reconverting the output of said channel into information corresponding to said binary form,
said transmitter terminal and channel including means for transmitting said binary signals over said half bandwidth channel by converting to biternary three-level form signals substantially the algebraic sum of said signal undelayed and delayed by one interval both in like polarity,
said receiver terminal including full wave rectifier means to convert the two extreme levels of said three level signal to one, and the median level to the other, level of a second binary form, the binary derivative of said one binary form,
and a binary integrator at one terminal,
whereby an input binary signal at the transmitter terminal is reproduced in corresponding form at the receiver terminal over a channel of only half the bandwidth required for binary transmission, and with only trivial conversion circuits.

13. A pulse communication system comprising:
a transmitter terminal for signals in one binary form clocked at regular intervals,
a channel having an operating bandwidth substantially only half that which would be required for transmitting information in said binary form,
and a receiver terminal including means for sampling at said intervals and reconverting the output of said channel into information corresponding to said binary form,
said transmitter terminal and channel including means for transmitting said binary signals over said half bandwidth channel by converting to biternary three-level form signals substantially the algebraic sum of said signal undelayed and delayed by one interval both in like polarity,
said receiver terminal including full wave rectifier means to convert the two extreme levels of said three level signal to one, and the median level to the other, level of a second binary form, the binary derivative of said one binary form,
whereby an input binary signal at the transmitter terminal is reproduced in corresponding form at the receiver terminal over a channel of only half the bandwidth required for binary transmission, and with only trivial conversion circuits.

14. A pulse communication system comprising:
a transmitter terminal for signals in one binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal and channel including means for transmitting said binary signals over said half bandwidth channel by converting to biternary three-level form signals substantially the algebraic sum of said signal undelayed and delayed by one interval both in like polarity, whereby an input binary signal at the transmitter terminal is reproduced in corresponding form at the receiver terminal over a channel of only half the bandwidth required for binary transmission.

15. A pulse communication system comprising:

a transmitter terminal for signals in one binary form clocked at regular intervals, a channel having an operating bandwidth substantially only $2^{-n}$ that which would be required for transmitting information in said binary form, and a receiver terminal including means for sampling at said intervals and reconverting the output of said channel into information corresponding to said binary form, said transmitter terminal and channel including means for transmitting said binary signals over said reduced bandwidth channel by converting to signals of $2^n+1$ levels, substantially the algebraic sum of said signal undelayed and delayed by each of intervals from one to $n$ all in like polarity, whereby an input binary signal at the transmitter terminal is reproduced in corresponding form at the receiver terminal over a channel of only $2^{-n}$ the bandwidth required for binary transmission.

16. A pulse communication system comprising:

a transmitter terminal for signals in binary form clocked at regular intervals, a channel having an operating bandwidth substantially only half that which would be required for transmitting information in said binary form, and a receiver terminal including means for sampling at said intervals and reconverting the output of said channel into information corresponding to said binary form, said transmitter terminal and channel including means for transmitting said binary signals over said half bandwidth channel by converting to biternary three-level form signals having a probability of 50% at a median value and 25% at each of two extreme values, in which samples of opposite extreme values are separated only by samples of median value of odd number, and samples of like extreme value are not separated by samples of median value unless of even number, said receiver terminal including full wave rectifier means to convert the two extreme levels of said three level signal to one, and the median level to the other, level of another binary form, whereby an input binary signal at the transmitter terminal is reproduced in corresponding form at the receiver terminal over a channel of only half the bandwidth required for binary transmission.

17. In a pulse communication system comprising:

a transmitter terminal, a channel having a predetermined operating bandwidth for binary signals, and a receiver terminal, the method of communication comprising:

providing a binary signal clocked at intervals corresponding to double the bandwidth suitable for transmission over said channel in binary form;

converting said signal by delaying substantially one interval and combining with said signal undelayed, both in like polarity, thus forming a three level signal of biternary form for transmittal over said channel;

and reconverting said biternary signal to a second two level signal of binary form, the binary derivative of said first binary form, one level corresponding to both extreme levels and the other to the median level of said biternary form, whereby an input binary signal at the transmitter terminal is reproduced in a corresponding binary form at the receiver terminal over a channel of only half the bandwidth required for binary transmission, and with only nominal conversion.

References Cited by the Examiner

UNITED STATES PATENTS

| | | | |
|---|---|---|---|
| 2,700,696 | 1/55 | Barker | 340—347 XR |
| 2,840,308 | 6/58 | Horne | 235—181 |
| 2,885,590 | 5/59 | Fuller | 235—181 |
| 2,897,477 | 7/59 | Lindsey | 235—181 XR |

OTHER REFERENCES

Nichols and Rauch: Radio Telemetry, John Wiley and Son, New York, 1958 (pp. 163–164 relied on).

DAVID G. REDINBAUGH, *Primary Examiner.*

MALCOLM A. MORRISON, *Examiner.*